HANS CHRISTOF KLEIN
INVENTOR.

BY Karl F. Ross
ATTORNEY

HANS CHRISTOF KLEIN
INVENTOR.

BY Karl F. Ross
ATTORNEY

United States Patent Office 3,532,391
Patented Oct. 6, 1970

3,532,391
NONSKID BRAKE SYSTEM HAVING HIGH-PRESSURE ACCUMULATOR AND RECIPROCATING PUMP
Hans-Christof Klein, Hattersheim (Main), Germany, assignor to Alfred Teves GmbH, Frankfurt am Main, Germany, a corporation of Germany
Filed Sept. 19, 1968, Ser. No. 760,769
Claims priority, application Germany, Sept. 26, 1967, T 34,886
Int. Cl. B60t 8/12
U.S. Cl. 303—21
13 Claims

ABSTRACT OF THE DISCLOSURE

A nonskid brake system having two accelerometer-controlled valves used in connection with a high-pressure and a low-pressure accumulator and a charging pump. The first valve disconnects the master cylinder from the wheel-brake cylinder and connects this wheel-brake cylinder to the high-pressure accumulator, and the second valve discharges the wheel-brake cylinder into the low-pressure accumulator. The charging pump has a master-cylinder-operated stepped (differential) piston which pressurizes the high-pressure accumulator on actuation of the brakes.

---

My present invention relates to a nonskid brake system having a high-pressure accumulator and used in conjunction with some acceleration-responsive means to prevent locking of the braked wheels of a vehicle during braking.

So-called "nonskid" or skid-preventing systems are known wherein an accelerometer or similar device responsive to motor-vehicle wheel deceleration is connected to two valves in the brake system. One of these valves is connected between the master cylinder and the wheel brake, while the other valve is connected between the wheel brake and a reservoir having no appreciable pressure head. An electrically driven pump, which is actuated by some switch device when fluid level in the low-pressure accumulator rises above a certain level, returns fluid from the latter to the master cylinder. In addition, a constriction is provided in a line between the master cylinder and the wheel brake so that the two are never altogether isolated.

With such a system, actuation of both valves interrupts the main line between the master cylinder and the wheel brake so that the two only communicate through the above-mentioned constriction. The second valve empties the wheel brake into the low-pressure accumulator. To prevent the brake pedal from slowly dropping, as brake fluid passes from the master cylinder through the restrictor into the low-pressure accumulator, the pump is actuated, e.g. by a float-controlled switch, when fluid level in this accumulator attains a predetermined level and pumps fluid from it back into the master cylinder through a check valve, thereby resulting in brake-pedal vibration, a totally undesirable phenomenon.

It is an object of my present invention to provide a brake system wherein such electrically operated pumps, their expense and other disadvantages, as outlined above, are obviated.

According to the main feature of this invention, when the first valve, i.e. the valve between the master cylinder and the wheel brake, is actuated, it completely cuts off the master cylinder from the wheel brake and further connects the wheel brake through a constriction or throttle to a high-pressure accumulator. In this manner, the brake pedal will not move, since the output line of its master cylinder is completely blocked by the first valve.

According to a further feature of my invention, the high-pressure accumulator is pressurized by a small hydraulically operated charging pump to incrementally increase the stored high pressure at each pressure stroke of the brake pedal; the charging pump is basically a stepped piston in a cylinder with its large face turned toward the master cylinder and its small face turned toward the high-pressure accumulator. A longitudinal bore, with an inlet or intake check valve, through the differential piston in cooperation with a second (outlet or discharge) check valve on the housing, allows the piston to move and to serve as a plunger, pressurizing the high-pressure accumulator by small amounts with each actuation of the brakes.

A further feature of my invention provides for a check valve to allow the low-pressure accumulator to empty after braking into the brake line, and a check valve between the master cylinder and the wheel-brake cylinder to allow the latter to empty into the former if need be.

The valves can be either combination ball-check valves or slider valves or both, and are preferably electromagnetically actuated.

My invention will be described in greater detail in the following, with reference to the drawing in which.

Figure 1:
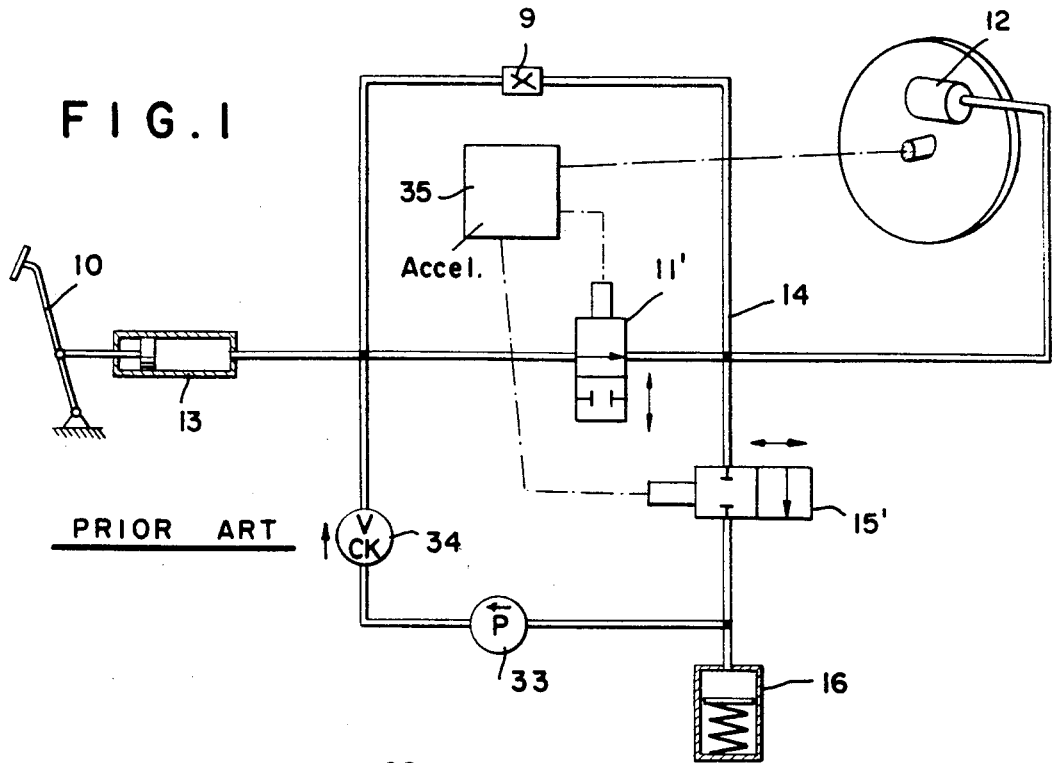
FIG. 1 is a schematic diagram of a representative prior-art nonskid brake system over which the present development is an improvement.

As seen in FIG. 1, a brake pedal 10 is connected to a master cylinder 13 in the prior-art system and this is connected through a first valve 11′ to a wheel-brake cylinder 12. The valve 11′ is bridged by a throttle or constriction (restrictor) 9 which permits some fluid flow from the master cylinder 13 to the cylinder 12 even with the valve 11′ closed. The opening in the restrictor 9 is extremely small, so that only a slight fluid loss therethrough is possible.

The first valve 11′ has a primary and a secondary position. In the primary position (illustrated in FIG. 1), the master cylinder 13 is connected directly to the wheel cylinder 12; in the secondary position this connection is interrupted.

A conduit 14 leads from the valve 11′ to a second valve 15′ which is connected to a low-pressure accumulator 16. The second valve 15′ has an open and a closed position and is shown in its closed position.

Both valves 11′ and 15′ are connected to an acceleration-responsive device such as an accelerometer 35 (e.g. as shown in the commonly assigned application Ser. No. 758,022 filed Sept. 25, 1968 by Fritz Ostwald and entitled "Accelerometer."

The low-pressure accumulator 16 is connected through an electrically operated rotary pump 33 and a check valve 34 to the master cylinder 13.

This system functions as follows:

Should the motor-vehicle wheel start to skid, the accelerometer 35 senses the excessive decrease in angular velocity of the wheel and the locking of its wheel brake and actuates the valve 11′ thus cutting the master cylinder 13 off from the wheel brake 12. Some fluid still flows, however, through the restrictor 9. Should the skid continue or increase, the accelerometer 35 actuates the valve 15 and thereby bleeds the wheel cylinder 12 into the low-pressure accumulator 16. When the fluid level in the accumulator 16 rises above a predetermined level, the pump 33 is electrically actuated and forces brake fluid back into the master cylinder 13 to prevent it from emptying completely and making the brake pedal 10 vibrate.

After the skid, both valves 11' and 15' return to their illustrated positions.

Figure 2:
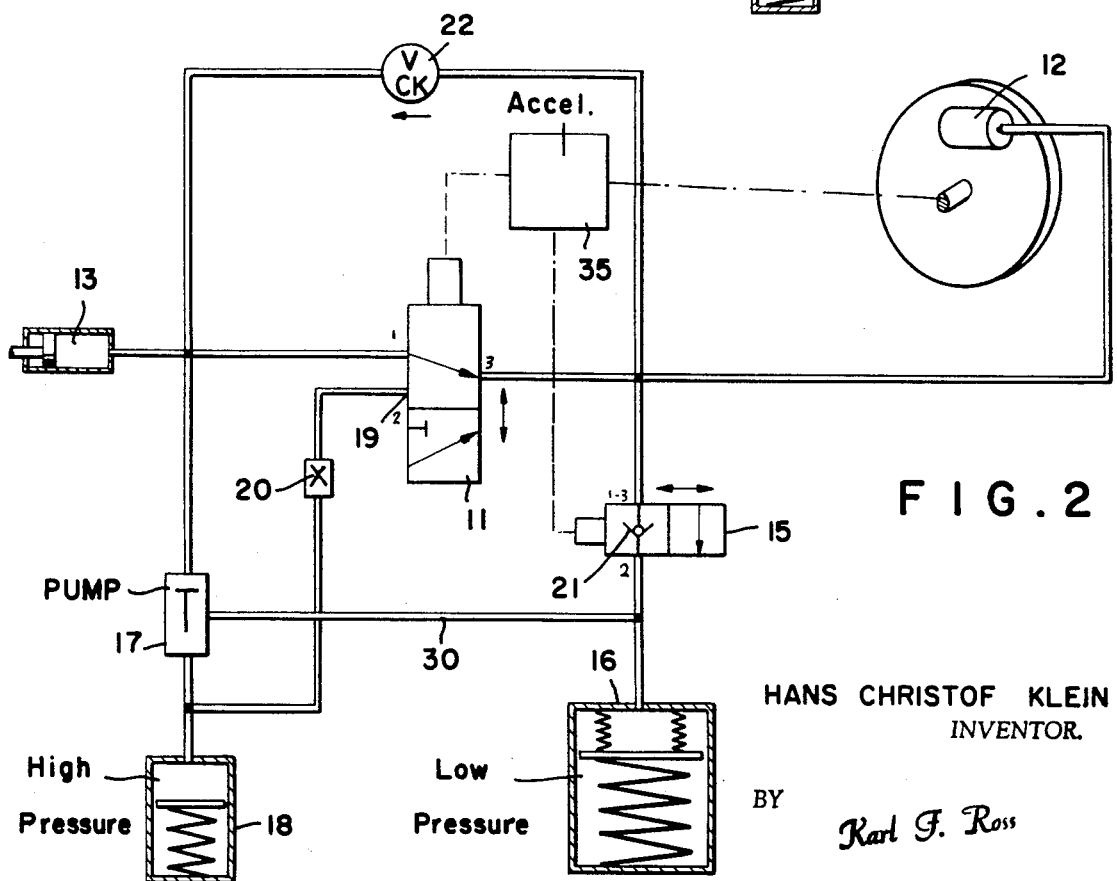
FIG. 2 is a schematic diagram of the nonskid brake system according to my invention.

The system shown in FIG. 2 corresponds substantially to that of FIG. 1 except for the special features provided for by my invention; reference numerals, wherever duplicated, represent the same structure as in FIG. 1.

My system is provided with a charging pump 17 connected between a high-pressure accumulator 18 (chapter 6, Fluid Power, U.S. Government Printing Office, Washington, D.C., 1966) and the master cylinder 13. This accumulator 18 can be connected through a first valve 11 and a restrictor 20 to the wheel cylinder 12.

A check valve 21 allows fluid flow from the low-pressure accumulator 16 to the master cylinder 13 through a second check valve 22 between the wheel brake 12 and the master cylinder 13 which valve 22 has the further function of ensuring that the pressure in the wheel cylinder 12 does not remain above that in the master cylinder 13.

The first valve 11 has a further connection 19 which connects it to the high-pressure accumulator 18 to permit the pressure in the accumulator 18 to do the job of the pressure passing through the restrictor 9 in FIG. 1, i.e. that of maintaining some pressure in the wheel brake 12 or of repressurizing it after a skid.

My system functions as follows:

In case of an imminent skid, the valve 11 moves from its primary position (illustrated in FIG. 2) to its secondary position wherein it disconnects the master cylinder 13 from the wheel cylinder 12 and connects this latter to the high-pressure accumulator 18 to maintain a certain fluid pressure therein. Should the skid worsen, the valve 15 is actuated to bleed the wheel brake 12 into the low-pressure accumulator 16, thereby reducing braking force and bringing the wheel out of the skid.

On termination of the braking operation, the fluid pressure built up in the low-pressure accumulator 15 escapes through the check valve 21, since both valves 11 and 15 have returned to their illustrated positions, and if for some reason valve 11 has not been restored, fluid escapes through the other check valve 22.

Figure 3:
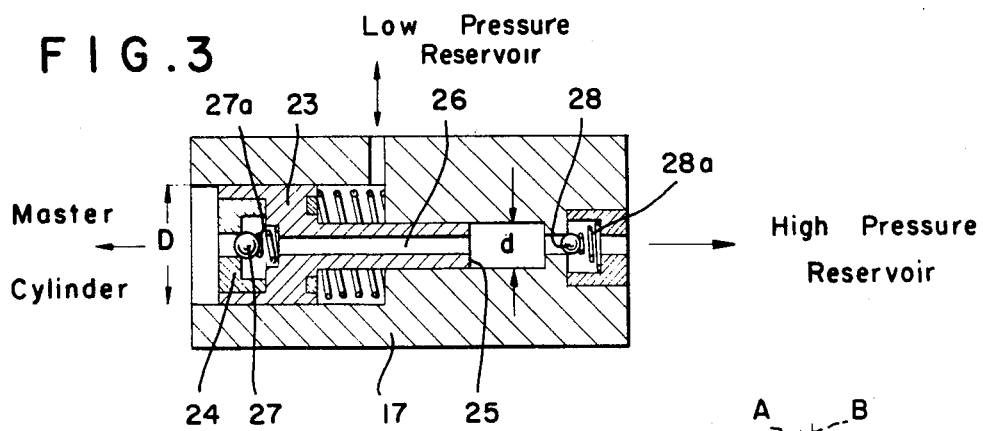
FIG. 3 is a longitudinal section through a charging pump usable in the system of FIG. 2.

In order to pressurize the high-pressure accumulator 18, a pump 17 as shown in FIG. 3 is used. This pump 17 has a stepped differential piston 23 with a large face 24 having a diameter $D$ and a small face 25 having a diameter $d$; the piston is biased by a spring 29 against the effective direction of the larger face. This piston 23 is formed with a ball-type intake check valve 27 biased by a spring 27a in a longitudinal bore 26, and the housing 17 has a check valve 28 biased by a spring 28a.

The large face 24 is turned toward the master cylinder 13 and the small face toward the high-pressure reservoir 18. On actuation of the master cylinder 13, this piston 23 is forced to the right in FIG. 3 and thereby, through known pressure-amplification principles, develops a higher pressure to its right than to its left. This pressurized fluid is forced through the check valve 28. On release of the master cylinder 13, the piston 23 returns under the force of the spring 29 to the left, and new fluid is taken into the bore 26 through the check valve 27. Thus, each actuation of the brakes incrementally pressurizes the high-pressure accumulator 18.

Figure 6:
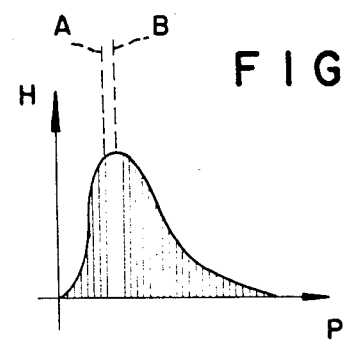
FIG. 6 is a graph illustrating the relationship between braking force in the master cylinder and in the wheel brake with the system in accordance with my invention.

As shown in FIG. 6, the pressure H in the wheel brake 12 is normally about ½ to ¾ of the pressure P in the master cylinder 13. At point A, valve 11 cuts in, and at point B, valve 15 is triggered. Consequently, the ratio between the diameters $d$ and $D$ of the opposing faces of the piston 23 should be between 1.2 and 2.2.

Figure 4:
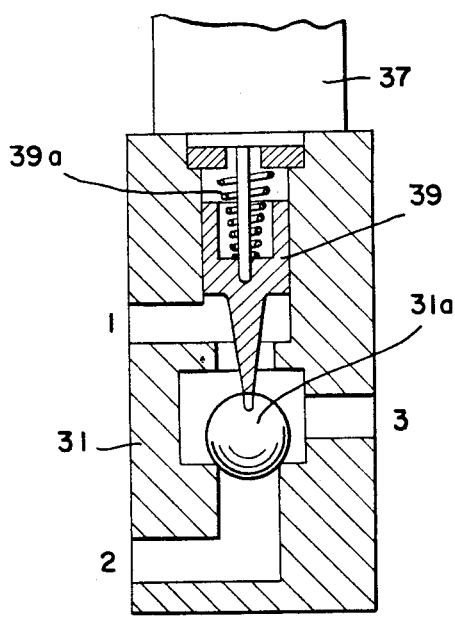
FIG. 4 is a longitudinal section through a valve usable in the system of FIG. 2.

FIG. 4 shows an electromagnetically actuatable combination ball-check valve 31 with a ball 31a held on a member 39 biased by a spring 39a and actuated by an electromagnet 37. This valve 31 can serve as either valve 11 or valve 15. The diameter of the member 39 should be slightly greater than that of the ball 31a so that the valve can also serve as an equalizing valve when connected in the position 11 in the system of FIG. 2.

Figure 5:
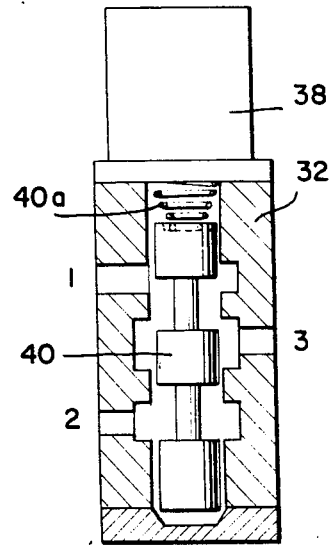
FIG. 5 is a longitudinal section through a slide valve usable in the system of FIG. 2.

FIG. 5 shows a slide valve 32 having a slider 40 biased by a spring 40a and actuated by an electromagnet 38. This slider 40 is preferably only around 4 mm. in diameter and has only around 1 mm. of overlap and a very limited stroke. In this manner, loss of vital braking fluid or force is no problem when the valve 32 is actuated. This valve is ideally suited to serve as valve 11.

The improvement described and illustrated is believed to admit of many modifications within the ability of persons skilled in the art, all such modifications being considered within the spirit and scope of the invention.

I claim:

1. A hydraulic motor-vehicle brake system comprising:
    brake-pressurizing means;
    a wheel brake actuatable by said pressurizing means;
    valve means responsive to motor-vehicle deceleration connected between said pressurizing means and said brake and having a first position permitting brake-fluid flow from said pressurizing means to said wheel brake, and a second position blocking brake-fluid flow from said pressurizing means to said wheel brake;
    a high pressure accumulator connected to said valve means and connectible therethrough to said wheel brake for pressurizing same in said second position of said valve means;
    pump means for pressurizing said high-pressure accumulator; and
    a low-pressure accumulator hydraulically connected to said valve means, said valve means having a third position blocking brake-fluid flow from said pressurizing means to said wheel brake and permitting brake-fluid flow from said wheel brake to said low-pressure accumulator.

2. The system defined in claim 1, further comprising a throttle valve connected between said high-pressure accumulator and said wheel brake restricting fluid flow therebetween in said second position of said valve means.

3. A hydraulic motor-vehicle brake system comprising:
    brake-pressurizing means including a master cylinder;
    a wheel brake actuatable by said pressurizing means;
    valve means responsive to motor-vehicle deceleration connected between said pressurizing means and said brake and having a first position permitting brake-fluid flow from said pressurizing means to said wheel brake, and a second position blocking brake-fluid flow from said pressurizing means to said wheel brake;
    a high-pressure accumulator connected to said valve means and connectible therethrough to said wheel brake for pressurizing same in said second position of said valve means; and
    pump means for pressurizing said high-pressure accumulator, and comprising:
        housing means forming a fluid-containing input chamber hydraulically connected to said master cylinder and a fluid-containing output chamber hydraulically connected to said high-pressure accumulator, and
        a movable member actuatable by said master cylinder and defining said chambers for pumping brake fluid from said output chamber to said high-pressure accumulator.

4. The system defined in claim 3, further comprising a check valve between said pressurizing means and said wheel brake permitting brake-fluid flow from the latter to the former.

5. The system defined in claim 1, further comprising a check valve connected between said wheel brake and said low-pressure accumulator, and permitting brake-fluid flow from the latter to the former.

6. The system defined in claim 1 wherein said pressurizing means includes a master cylinder.

7. The system defined in claim 3, wherein said pump means includes a spring biasing said member toward said input chamber, and a check valve connected between said output chamber and said high-pressure accumulator for permitting unidirectional brake-fluid flow from the former to the latter, said movable member being formed as a stepped piston having a large-area face turned toward said input chamber and a small-area face turned toward said output chamber whereby hydraulic actuation of said piston by said master cylinder causes said piston to pump brake fluid from said output chamber past said check valve into said high-pressure accumulator.

8. The system defined in claim 7 wherein said piston is formed with a longitudinal bore extending between said chambers and said pump means further comprises a second check valve in said bore permitting brake-fluid flow from said input chamber through said bore and into said output chamber.

9. The system defined in claim 7 wherein said housing means is formed with a third chamber between said input and output chambers, said third chamber communicating with said low-pressure accumulator to provide a leakage path thereto from said third chamber.

10. The system defined in claim 1 wherein:
said valve means comprises a first valve having a primary position permitting brake-fluid flow from said pressurizing means to said wheel brake and a secondary position blocking brake-fluid flow from said pressurizing means to said wheel brake and permitting brake-fluid flow from said high-pressure accumulator to said wheel brake, and
a second valve having an open position permitting brake-fluid flow from said wheel brake to said low-pressure accumulator and a closed position blocking brake-fluid flow from said wheel brake to said low-pressure accumulator;
said first position of said valve means corresponds to said primary position of said first valve and said closed position of said second valve;
said second position corresponds to said secondary position of said first valve and said closed position of said second valve; and
said third position corresponds to said secondary position of said first valve and said open position of said second valve.

11. The system defined in claim 10, further comprising an accelerometer responsive to motor-vehicle deceleration and generating an electric analog output of motor-vehicle deceleration, said valves being electromagnetically actuatable and connected to said accelerometer for actuation by the accelerometer.

12. The system defined in claim 10 wherein one of said valves is a slide valve of limited stroke.

13. The system defined in claim 10 wherein one of said valves is a ball check valve.

References Cited
UNITED STATES PATENTS

| | | | |
|---|---|---|---|
| 2,826,278 | 3/1958 | Highley | 188—181 |
| 3,124,220 | 3/1964 | Kell | 188—181 |
| 3,425,751 | 2/1969 | Wehde et al. | 303—21 |

MILTON BUCHLER, Primary Examiner

J. J. McLAUGHLIN, Jr., Assistant Examiner

U.S. Cl. X.R.

188—181; 303—6, 10, 61